(12) United States Patent
Smith et al.

(10) Patent No.: US 6,682,232 B2
(45) Date of Patent: Jan. 27, 2004

(54) CAMERA MECHANISM HAS SUBSTITUTE ACTUATOR TO FUNCTIONALLY REPLACE FAILED PRIMARY ACTUATOR

(75) Inventors: Stephen J. Smith, Shortsville, NY (US); Michael P. Cramer, Victor, NY (US); James D. Boyd, Rochester, NY (US); Craig A. Baker, Marion, NY (US)

(73) Assignee: Eastman Kodak Company, Rochester, NY (US)

( * ) Notice: Subject to any disclaimer, the term of this patent is extended or adjusted under 35 U.S.C. 154(b) by 54 days.

(21) Appl. No.: 10/174,307

(22) Filed: Jun. 18, 2002

(65) Prior Publication Data

US 2003/0231882 A1 Dec. 18, 2003

(51) Int. Cl.$^7$ ................................................ G03B 1/18
(52) U.S. Cl. ........................ 396/444; 396/443; 396/452
(58) Field of Search ................................ 396/443, 444, 396/452–510

(56) References Cited

U.S. PATENT DOCUMENTS

| | | | | | |
|---|---|---|---|---|---|
| 4,040,072 | A | * | 8/1977 | Johnson et al. | 396/503 |
| 4,211,480 | A | * | 7/1980 | Kitai et al. | 396/465 |
| 5,365,291 | A | * | 11/1994 | Maeda | 396/12 |
| 6,061,530 | A | * | 5/2000 | Haraguchi | 396/319 |
| 6,272,290 | B1 | * | 8/2001 | Mogamiya | 396/59 |

* cited by examiner

*Primary Examiner*—Russell Adams
*Assistant Examiner*—Michael Dalakis
(74) *Attorney, Agent, or Firm*—Roger A. Fields

(57) ABSTRACT

A camera mechanism comprises a shutter blade movable to uncover and cover an exposure aperture; a primary spring connected to the shutter blade to normally move the shutter blade to cover the exposure aperture, but susceptible of becoming disconnected from the shutter blade, and a substitute spring connected to the shutter blade to alternatively move the shutter blade to cover the exposure aperture when the primary spring becomes disconnected from the shutter blade.

11 Claims, 18 Drawing Sheets

CAMERA MECHANISM HAS SUBSTITUTE ACTUATOR TO FUNCTIONALLY REPLACE FAILED PRIMARY ACTUATOR

FIELD OF THE INVENTION

The invention relates generally to cameras such as so-called disposable single-use or one-time-use cameras, and in particular to a camera mechanism that has a substitute or back-up actuator intended to fictionally replace a failed primary actuator.

BACKGROUND OF THE INVENTION

General

Film and cameras that are all in one, commonly referred to as disposable single-use or one-time-use cameras, have become well known. The one-time-use camera is a simple point-and-shoot type camera comprising a conventional film cartridge within a cartridge receiving chamber in a main body part, an unexposed film roll prewound from the film cartridge onto a film supply spool within a film supply chamber in the main body part, a film-exposing backframe opening between the cartridge receiving and film supply chambers in the main body part, a fixed-focus taking lens, a manually rotatable film winding thumbwheel coaxially engaged with a film winding spool inside the film cartridge, a single-blade shutter, a manually depressible shutter release button, an exposure counter wheel that has a numerical series of evenly spaced exposure count indicia and is incrementally rotated to successively view the exposure count indicia, an anti-backup pawl that engages the exposure counter wheel to prevent its reverse rotation, a direct see-through viewfinder having front and rear viewfinder lenses, and in some models an electronic flash. A pair of separate front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

To take a picture, the shutter release button is manually depressed. This causes a spring-urged high-energy lever to be released to strike the shutter blade, which then pivots open to uncover an exposure aperture. A return spring connected to the shutter blade pivots the shutter blade closed to re-cover the exposure aperture. Also, a metering lever is pivoted out of spring-biased engagement with the thumbwheel in order to permit manual rotation of the thumbwheel in the film winding direction after the picture is taken. When the thumbwheel is rotated in a film winding direction, it similarly rotates the film winding spool inside the film cartridge to wind an exposed frame of the filmstrip from the backframe opening into the film cartridge and advance an unexposed frame of the filmstrip from the unexposed film roll to the backframe opening. The rewinding movement of the filmstrip the equivalent of slightly more than one frame width rotates a metering sprocket in engagement with successive perforations in the filmstrip to decrement the exposure counter wheel to its next lower-numbered indicia. Also, the high energy lever is re-cocked or re-set and the metering lever is pivoted into re-engagement with the thumbwheel. When the metering lever re-engages the thumbwheel, further manual rotation of the thumbwheel in the film winding direction is prevented and the camera is ready to take another picture.

When the maximum number of exposures available on the filmstrip have been made and the filmstrip is completely wound into the film cartridge, the one-time-use camera is given to a photofinisher who breaks away a cover door portion of the rear cover part from the main body part and removes the film cartridge with the exposed filmstrip from the cartridge receiving chamber. Then, he removes the exposed filmstrip from the film cartridge to develop the latent images and make prints for the customer.

Possible Prior Art Problem

If the return spring connected to the shutter blade to pivot the shutter blade closed becomes disconnected from the shutter blade or otherwise becomes disabled, further picture-taking is prevented.

SUMMARY OF THE INVENTION

Generally speaking, the invention is a camera mechanism comprising:

an operation-performing device actuatable to perform a camera operation;

a primary actuator actuating the operation-performing device to perform the camera operation, but susceptible of becoming mechanically disabled; and a substitute actuator actuating the operation-performing device to perform the camera operation when the primary actuator is mechanically disabled.

A preferred embodiment of the camera mechanism comprises:

a shutter blade movable to uncover and cover an exposure aperture;

a primary spring connected to the shutter blade to normally move the shutter blade to cover the exposure aperture, but susceptible of becoming disconnected from the shutter blade; and a substitute spring connected to the shutter blade to alternatively move the shutter blade to cover the exposure aperture when the primary spring becomes disconnected from the shutter blade.

DETAILED DESCRIPTION OF THE INVENTION

The invention is disclosed as being embodied preferably in a disposable one-time-use camera. Because the features of a one-time-use camera unit are generally known, the description which follows is directed in particular only to those elements forming part of or cooperating directly with the disclosed embodiment. It is to be understood, however, that other elements may take various forms known to a person of ordinary skill in the art.

Figure 1:
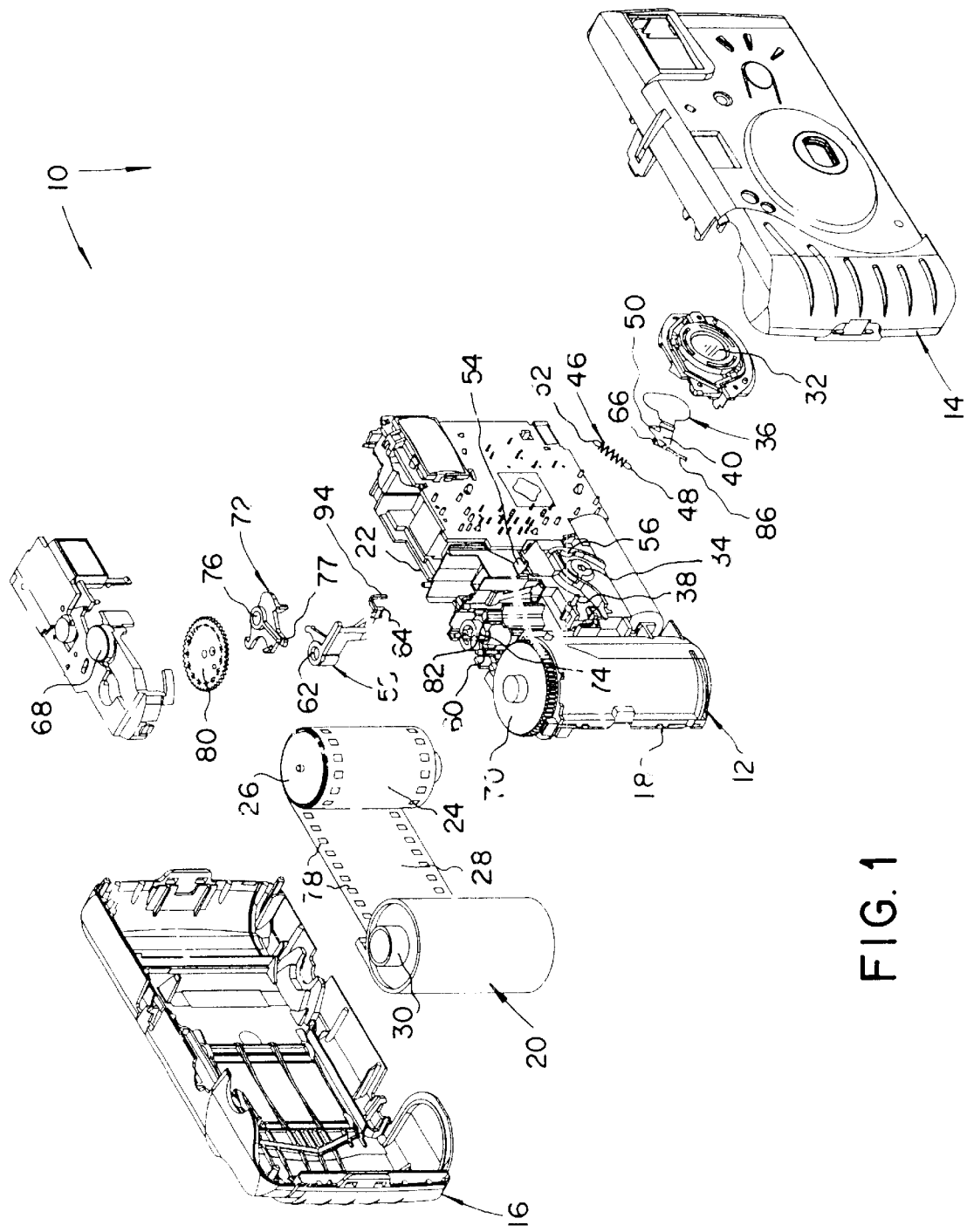
FIG. 1 is a front, exploded, perspective view of a preferred embodiment of the camera mechanism.
Figure 2:
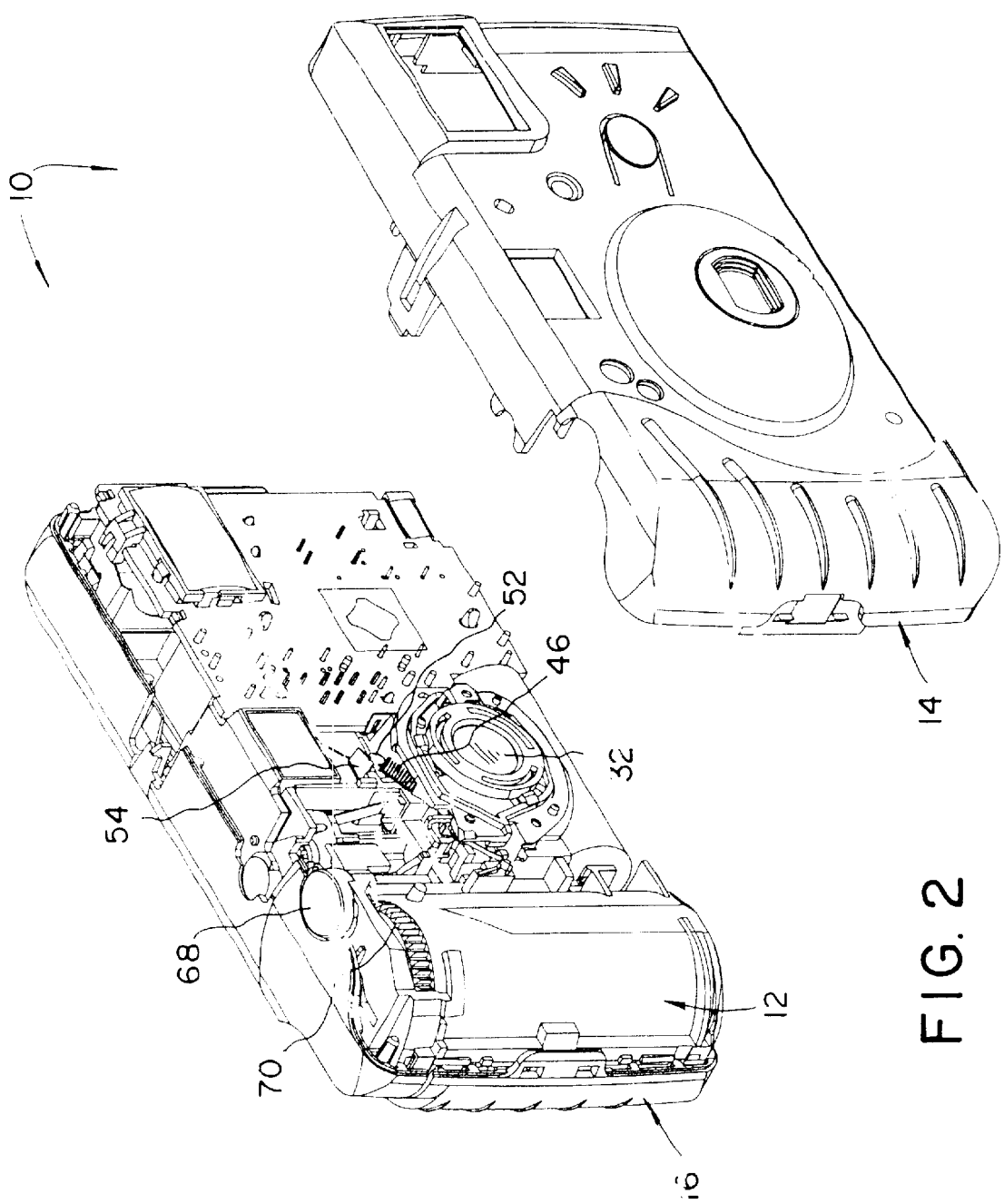
FIG. 2 is a front perspective view of the camera mechanism similar to FIG. 1, but showing the camera mechanism partially assembled.
Figure 3:
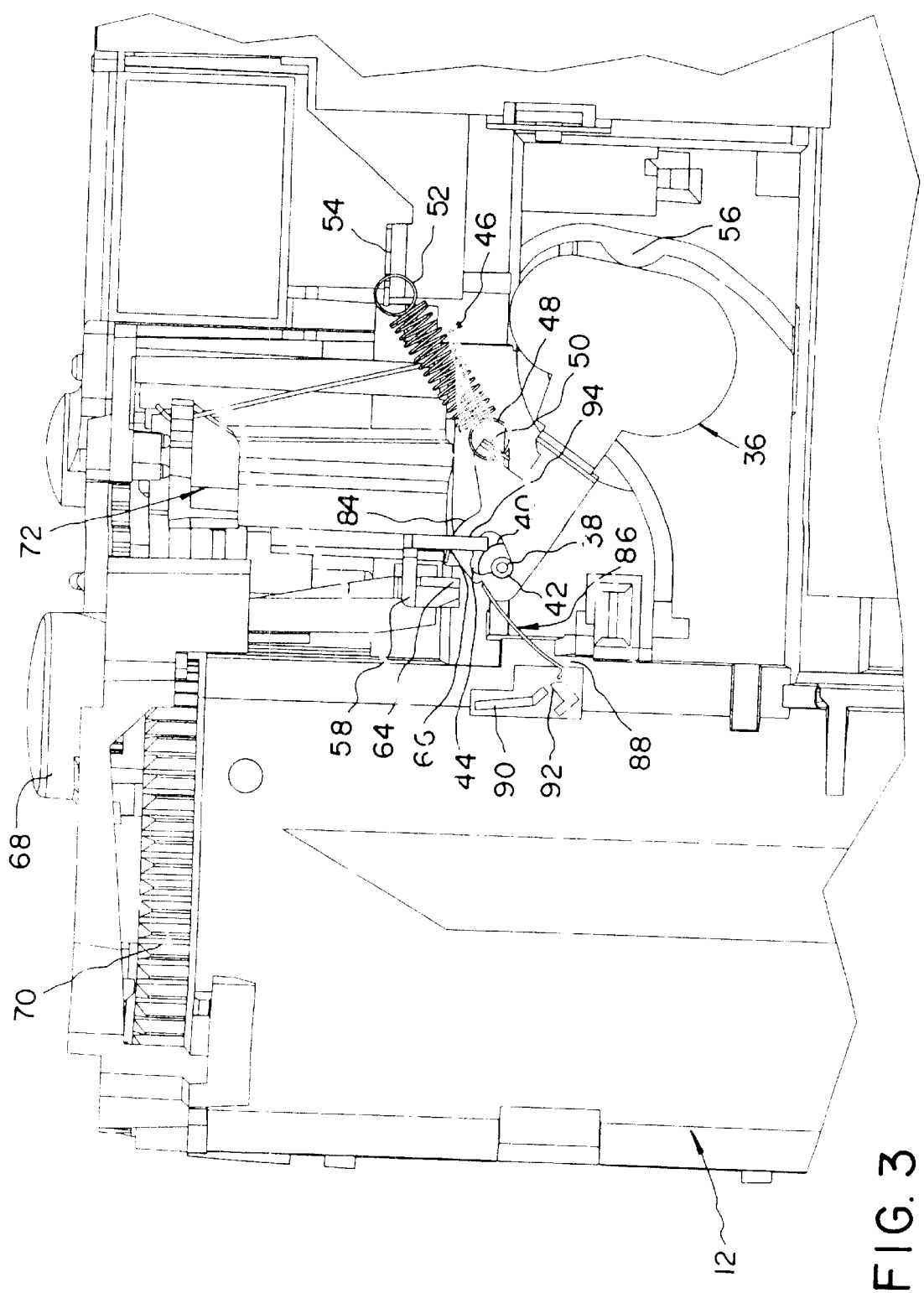
FIGS. 3–18 are front views of the camera mechanism, depicting its operation.
Figure 4:
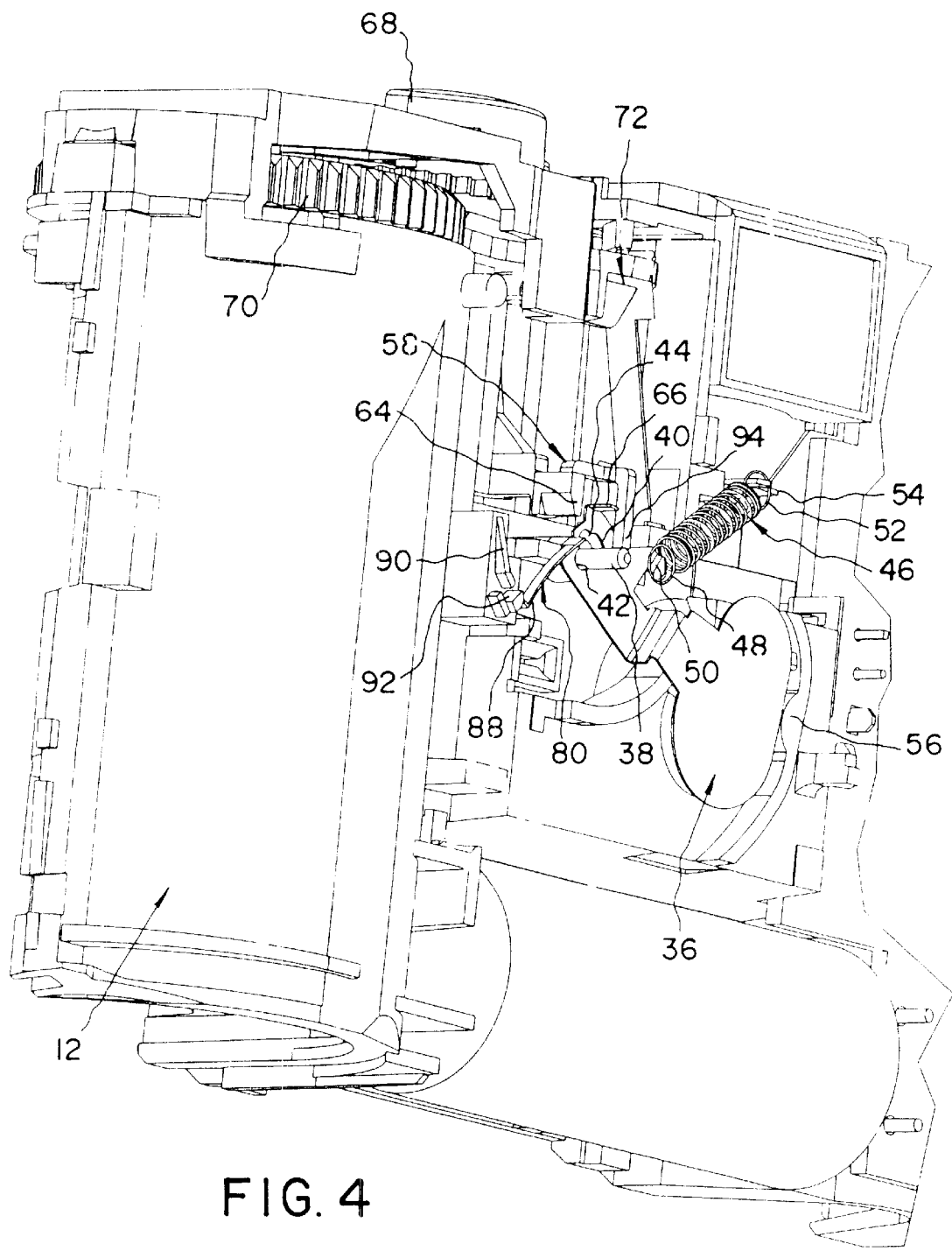
Figure 5:
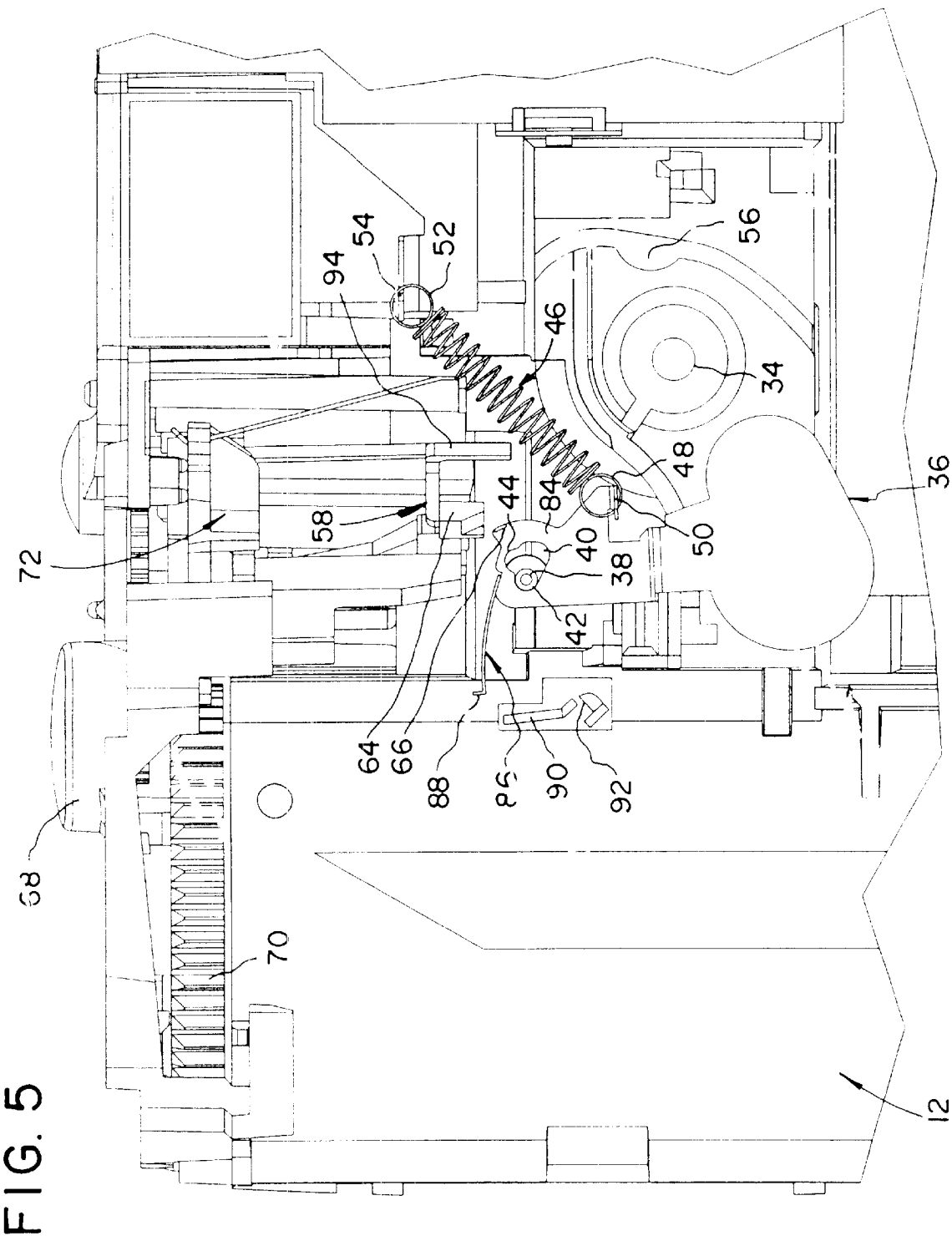
Figure 6:
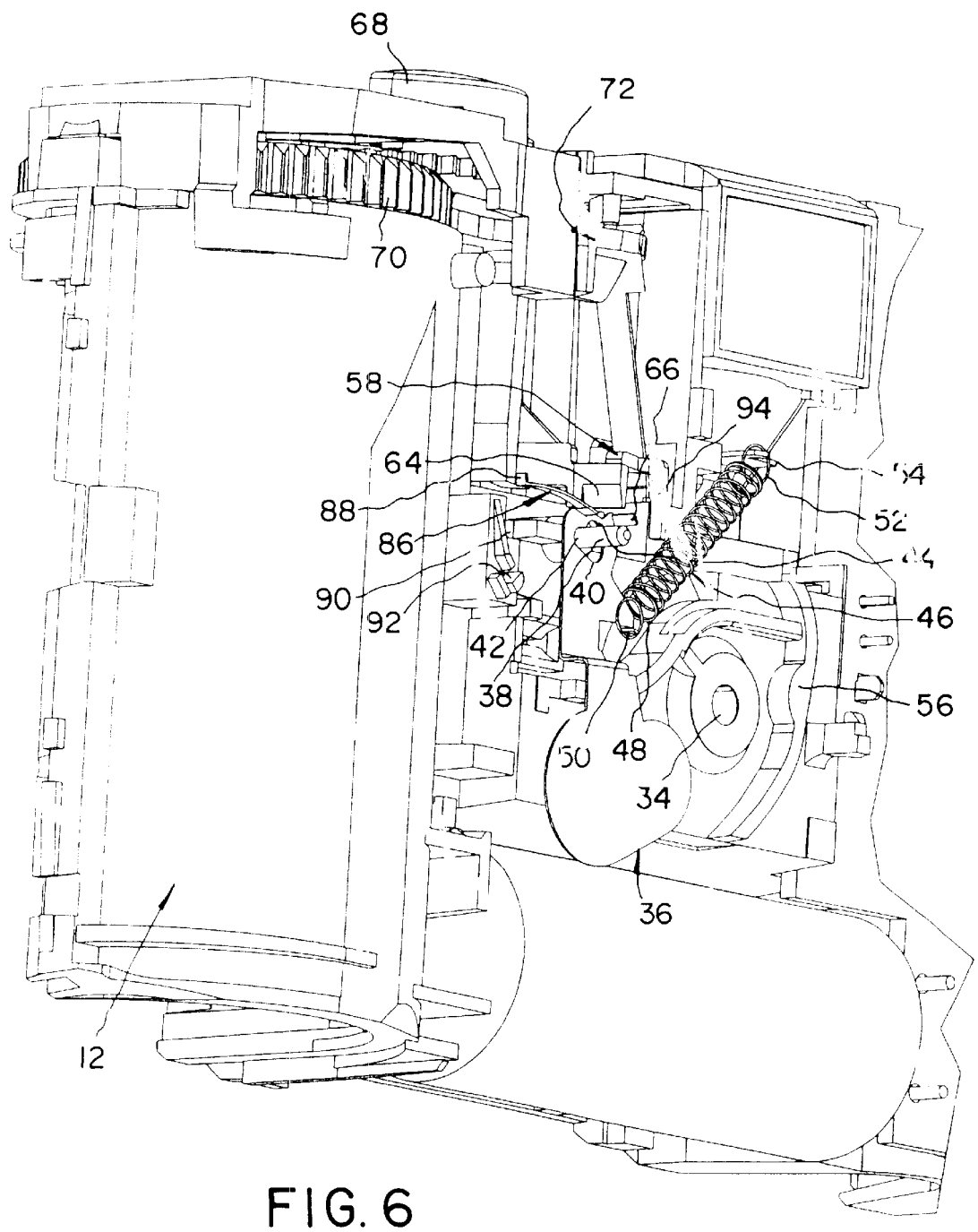

Referring now to the drawings, FIGS. 1 and 2 show a disposable one-time-use camera 10 including an opaque main body part 12, an opaque front cover part 14, and an opaque exterior rear cover part 16. The front cover part 14 and the rear cover part 16 house the main body part 12 between them and are connected releasably to one another and to the main body part 12 via known-type hook-in-hole and other connections.

As is typical, the main body part 12 has a rearwardly open cartridge receiving chamber 18 for a conventional 35 mm film cartridge 20 and a rearwardly open film supply chamber 22 for an unexposed film roll 24 on a rotatable film supply spool 26. During assembly of the camera 10, an unexposed filmstrip 28 is substantially prewound from a rotatable film winding spool 30 in the film cartridge 20 and into the unexposed film roll 24 on the film supply spool 26. A rearwardly open backframe opening (not shown) is located between the cartridge receiving chamber 18 and the film supply chamber 22 for exposing successive frames of the filmstrip 28 when ambient light is received through a front fixed-focus taking lens 32 mounted on the main body part 12 and through an exposure aperture 34 in the main body part.

As shown in FIGS. 1 and 3–6, a shutter blade 36 is pivotally mounted on a fixed post 38 on the main body part 12, between the front taking lens 32 and the exposure aperture 34. An opening 40 in one end portion of the shutter blade 36 has spaced first and second alternative fulcrum-recesses 42 and 44 for the post 38. The shutter blade 36 is pivotable open, i.e. clockwise in FIGS. 3–6, about the post 38 when the post is in the first fulcum-recess 42, to uncover the exposure aperture 34. A primary return spring 46 has one end 48 connected to a hook 50 on the shutter blade 36 and another end 52 connected to a hook 54 on the main body part 12, to urge the shutter blade to pivot closed, i.e. counter-clockwise in FIGS. 3–6, about the post 38, to re-cover the exposure aperture 34. The shutter blade 36 comes to rest against an abutment stop 56 on the main body part 12.

A high-energy lever 58 is pivotably mounted on the main body part 12 via a fixed post 60 on the main body part that extends into a hole 62 in the high-energy lever. The high-energy lever 58 is pivoted counter-clockwise in FIGS. 1 and 3–6 about the post 60 by a torsion spring (not shown) to swing a striker 64 of the high-energy lever against a tang or tab 66 of the shutter blade 36, to pivot the shutter blade open to uncover the exposure aperture 34. A latch (not shown) on the underside of a known-type manually depressible shutter release button 68 normally engages the high-energy lever 58 to prevent the high-energy lever from being pivoted for the striker 64 to impact the tang 66 of the shutter blade 36. When the shutter release button 68 is manually depressed to take a picture, the latch releases the high-energy lever 58 (which then is pivoted by the torsion spring).

A known-type film winding thumbwheel 70 coaxially engages the film winding spool 30 in the film cartridge 20 and peripherally protrudes from an elongate narrow opening (not shown) in the rear cover part 16. When the thumbwheel 70 is manually rotated in a film winding direction, i.e. counter-clockwise in FIG. 1, it similarly rotates the film winding spool 30. This is done in order to wind an exposed frame of the filmstrip 28 into the film cartridge 20 after a picture is taken, and to move a fresh frame of the filmstrip from the unexposed film roll 24 to behind the exposure aperture 34.

A known-type metering lever 72 is pivotably mounted on the main body part 12 via a fixed post 74 on the main body part 12 that extends into a hole 76 in the metering lever. The metering lever 72 is spring-biased clockwise in FIG. 1 and has a tooth 77 that normally engages the thumbwheel 70 to prevent winding rotation of the thumbwheel. When the high-energy lever 58 is pivoted counter-clockwise in FIGS. 1 and 3–6 to pivot the shutter blade 36 open to uncover the exposure aperture 34, the high-energy lever pivots the metering lever 72 counter-clockwise in FIG. 1 to disengage the tooth 77 from the thumbwheel 70.

After the primary return spring 46 pivots the shutter blade 36 closed to re-cover the exposure aperture 34 and the shutter blade comes to rest against the abutment stop 56, the thumbwheel 70 is manually rotated to wind the filmstrip 28 the equivalent of slightly more than one frame width. As the filmstrip 28 is moved it rotates a known-type metering sprocket (not shown) in engagement with successive perforations 78 in the filmstrip, to decrement a known-type rotatable exposure counter wheel 80 to its next lower-numbered indicia. Also, a known-type cam 82 connected to the metering sprocket and shown in FIG. 1 pivots the high-energy lever 58 counter-clockwise about the post 60 in FIG. 1 to be re-cocked or reset, and the metering lever 72 is pivoted counter-clockwise about the post 74 in FIG. 1 to re-engage the thumbwheel 70. As the high-energy lever 58 is pivoted counter-clockwise, its striker 64 momentarily bears against a curved edge 84 of the shutter blade 36 to slightly shift the shutter blade relative to the post 38 in order for the striker to move past the shutter blade; however, the primary return spring 46 restores the shutter blade to its former position once the striker is moved beyond the shutter blade. Then, when the metering lever 72 re-engages the thumbwheel 70, further winding rotation of the thumbwheel is prevented and the camera 10 is ready to take another picture.

A substitute or back-up return spring 86 longitudinally extends integrally from the shutter blade 36 and has a free end 88 that swings clockwise with the shutter blade when the shutter blade is pivoted open to uncover the exposure aperture 34 as shown in FIGS. 3–6. The free end 88 swings spaced from a ramp 90 and a trap or catch 92 on the main body part 12.

Figure 7:
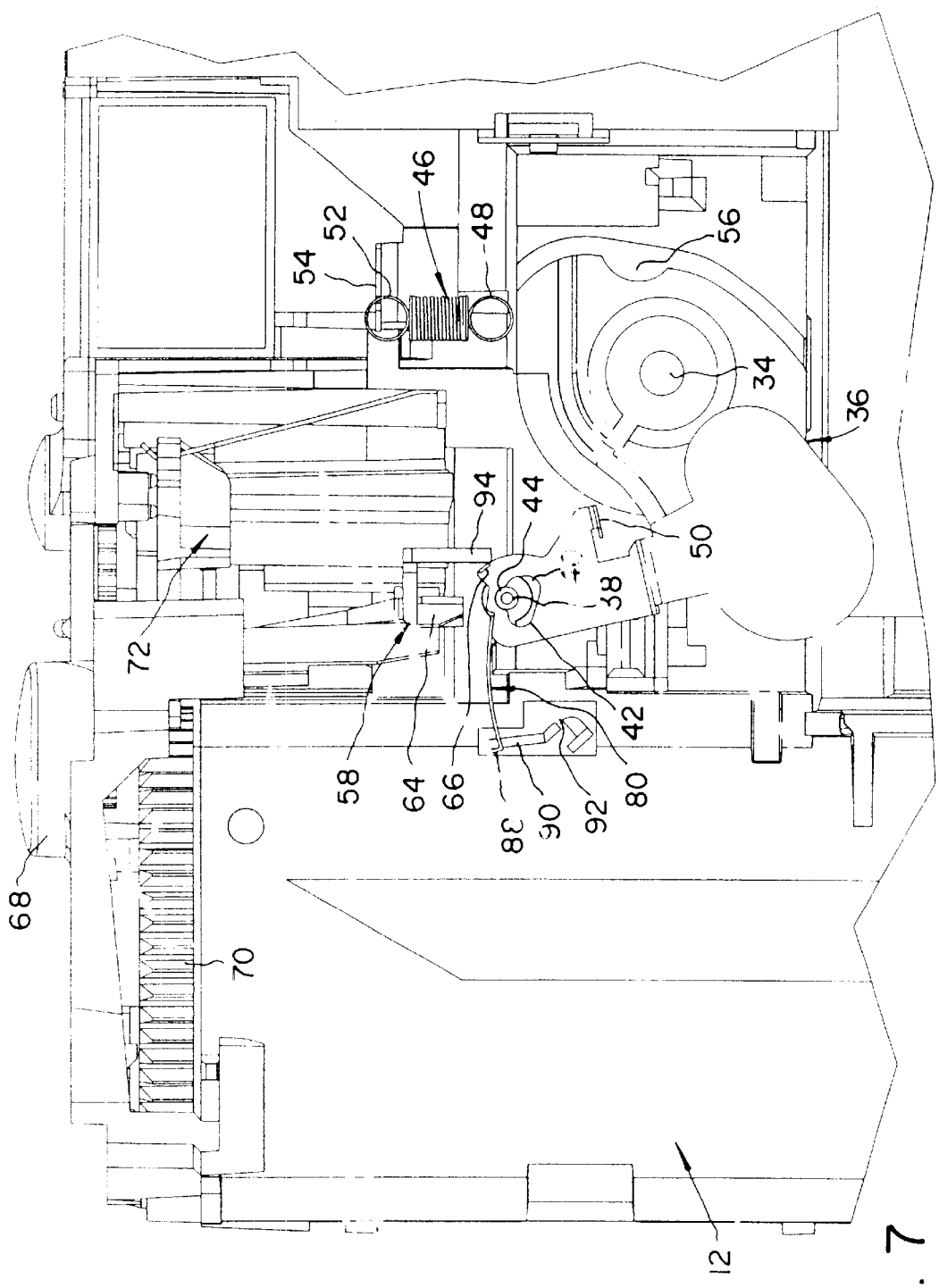
Figure 8:
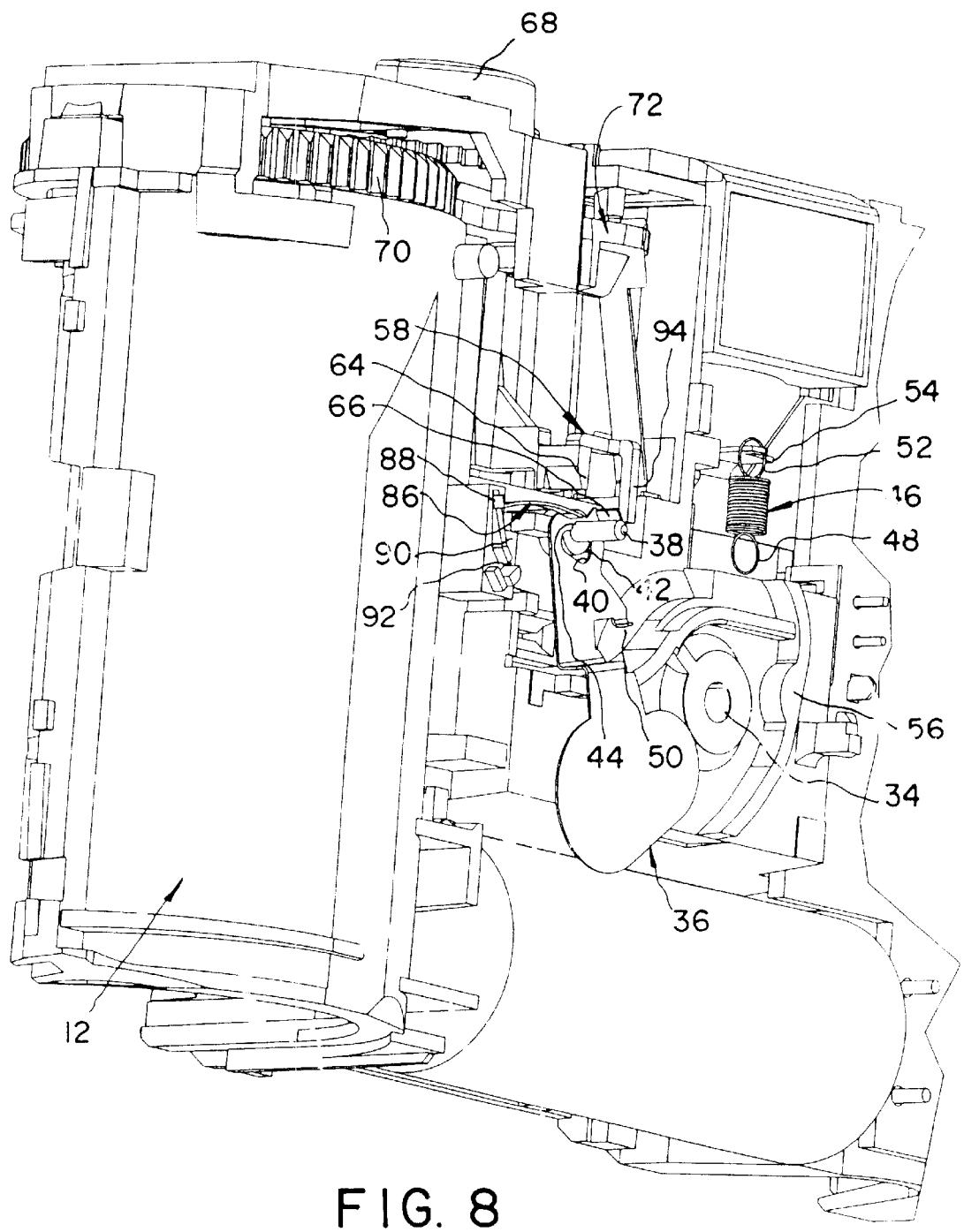
Figure 9:
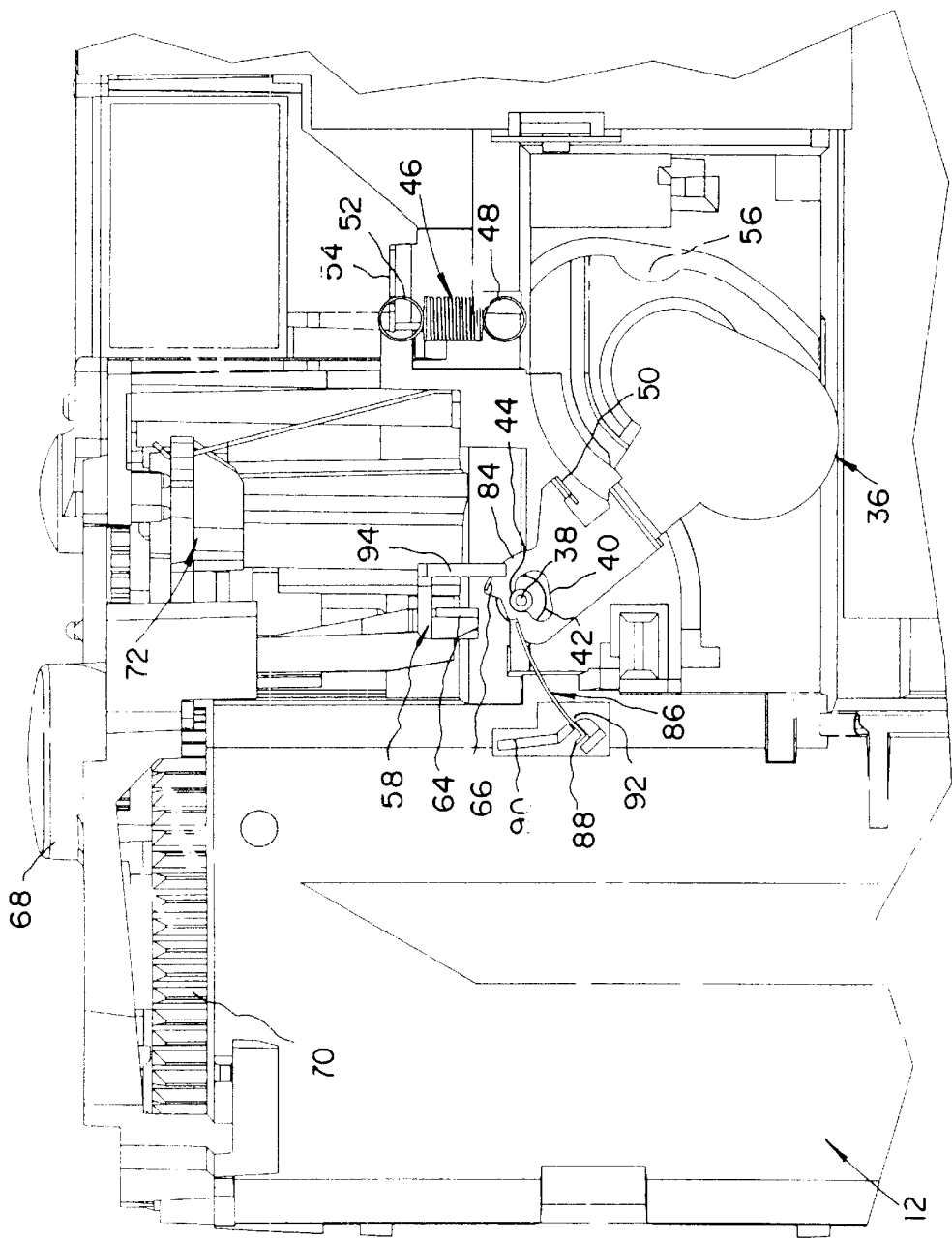
Figure 10:
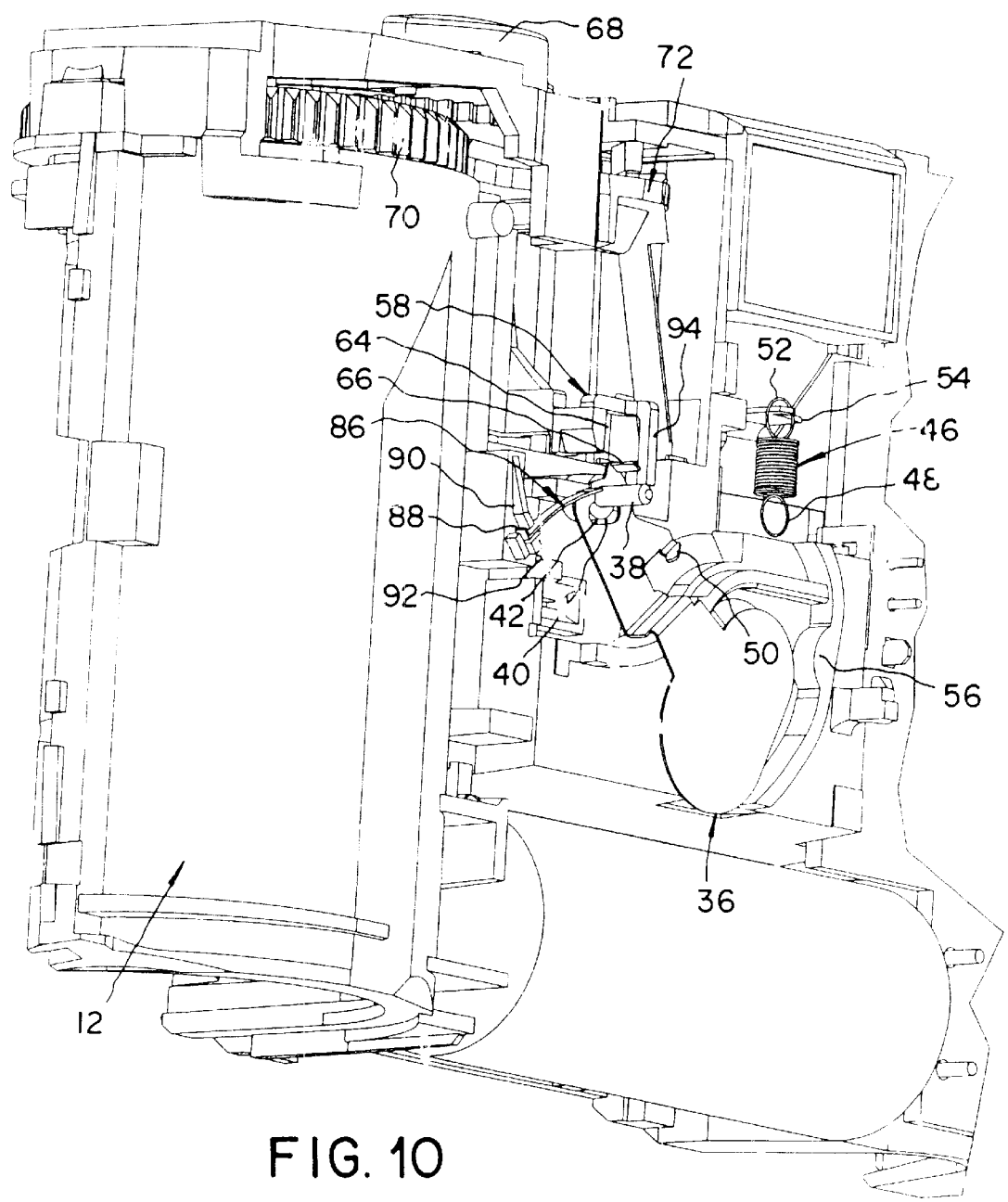

The substitute return spring 86 is intended to functionally replace the primary return spring 46 when the shutter blade 36 is pivoted open to uncover the exposure aperture 34 and the primary return spring becomes disabled or fails, such as because its end 48 disconnects from the hook 50 on the shutter blade as shown in FIGS. 7 and 8. In this instance, the shutter blade 36 shifts to remove the first fulcrum recess 42 from the post 38 and move the second fulcrum-recess 44 to the post. Consequently, the free end 88 of the substitute spring 86 is swung from being spaced from the ramp 90 to onto the ramp.

Figure 11:
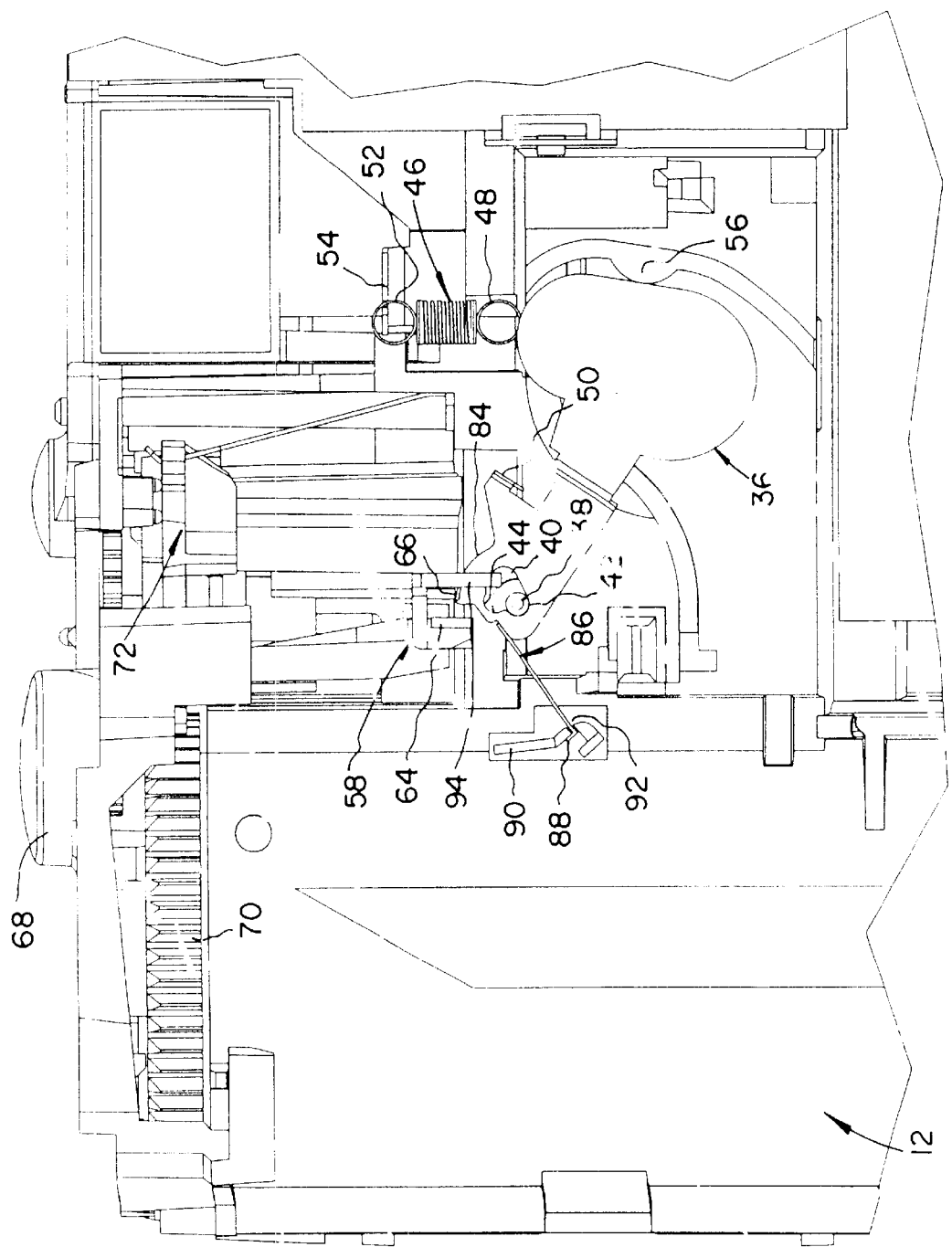
Figure 12:
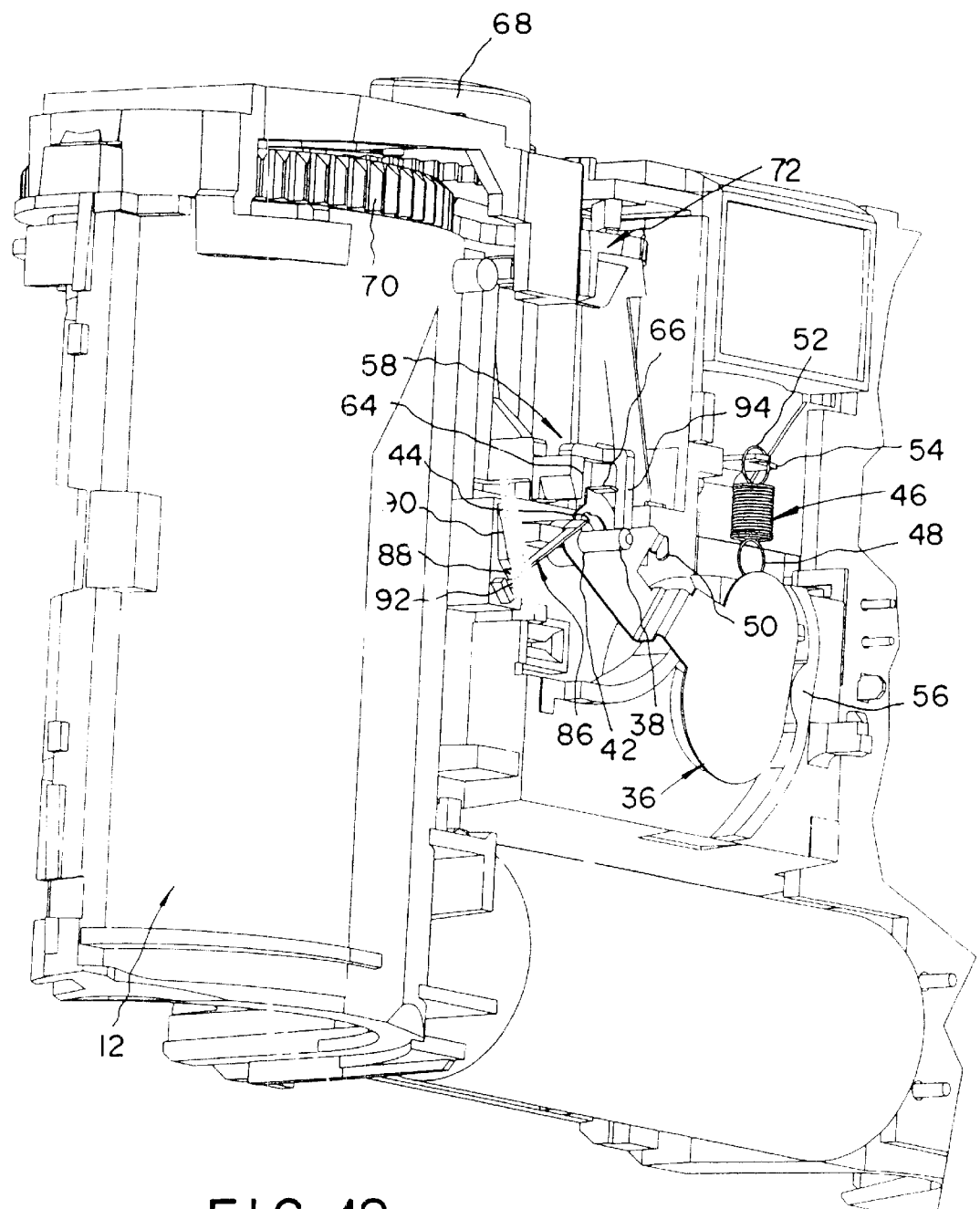

Then, when the thumbwheel 70 is manually rotated to wind the filmstrip 28 the equivalent of slightly more than one frame width, the cam 82 pivots the high-energy lever 58 counter-clockwise about the post 60 in FIGS. 7–10 to be re-cocked or reset. As the high-energy lever 58 is initially pivoted, a return finger 94 on the high-energy lever pushes against the tang 66 of the shutter blade 36 to pivot the shutter blade (with the post 38 in the second fulcum-recess 44) to re-cover the exposure aperture 34 and swing the free end 88 of the substitute spring 86 up the ramp 90 and into the trap 92. See FIGS. 9 and 10. Then, as the high-energy lever 58 is further pivoted, the return finger 94 continues to push against the tang 66 and further pivot the shutter blade 36 as shown in FIGS. 11 and 12. The shutter blade 36 shifts to remove the second fulcrum recess 44 from the post 38 and return the first fulcrum-recess 42 to the post, and comes to rest against the abutment stop 56.

The metering lever 72 is pivoted counter-clockwise about the post 74 in FIG. 1 and, when it re-engages the thumbwheel 70, further winding rotation of the thumbwheel is prevented and the camera 10 is ready to take another picture.

Figure 13:
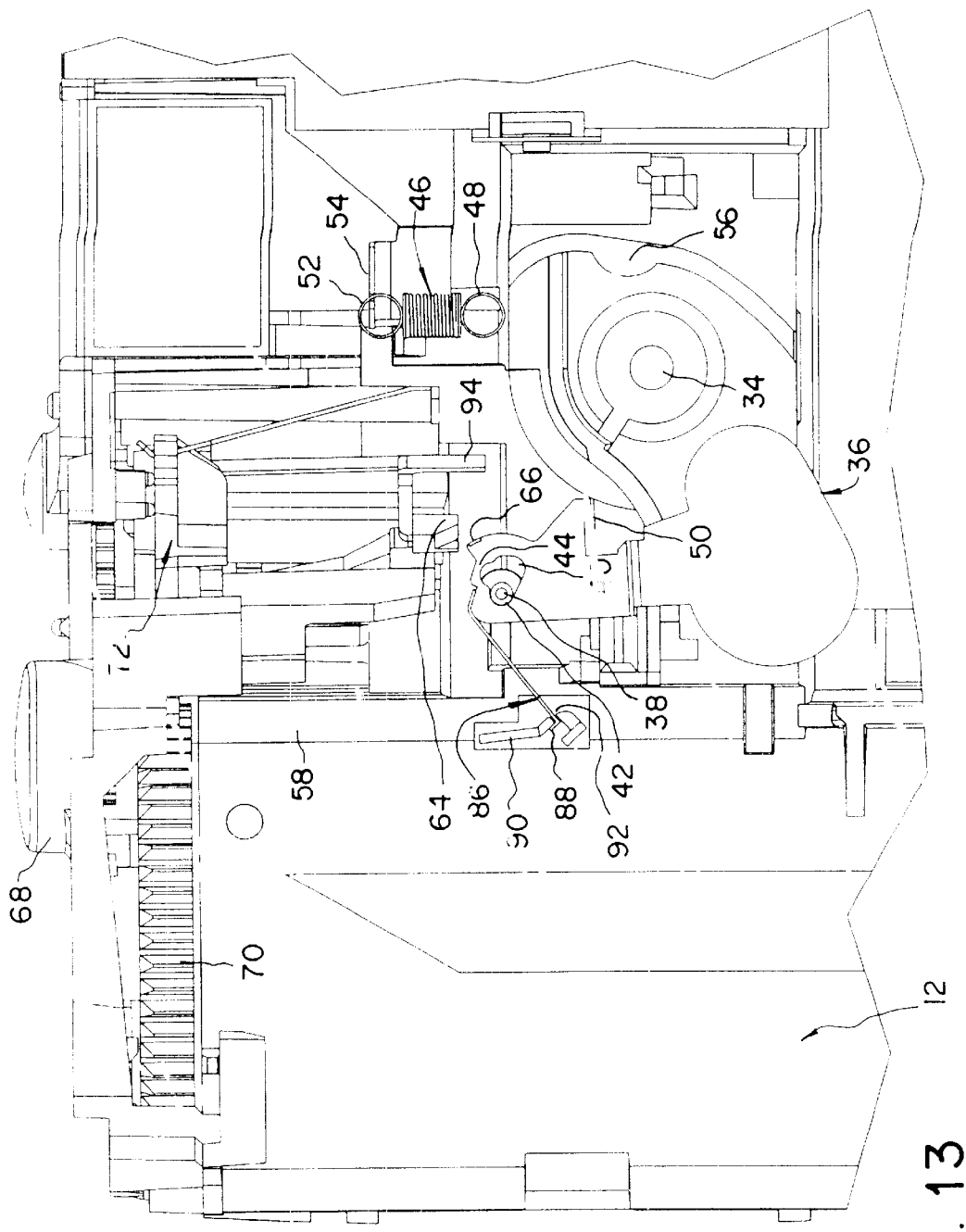
Figure 14:
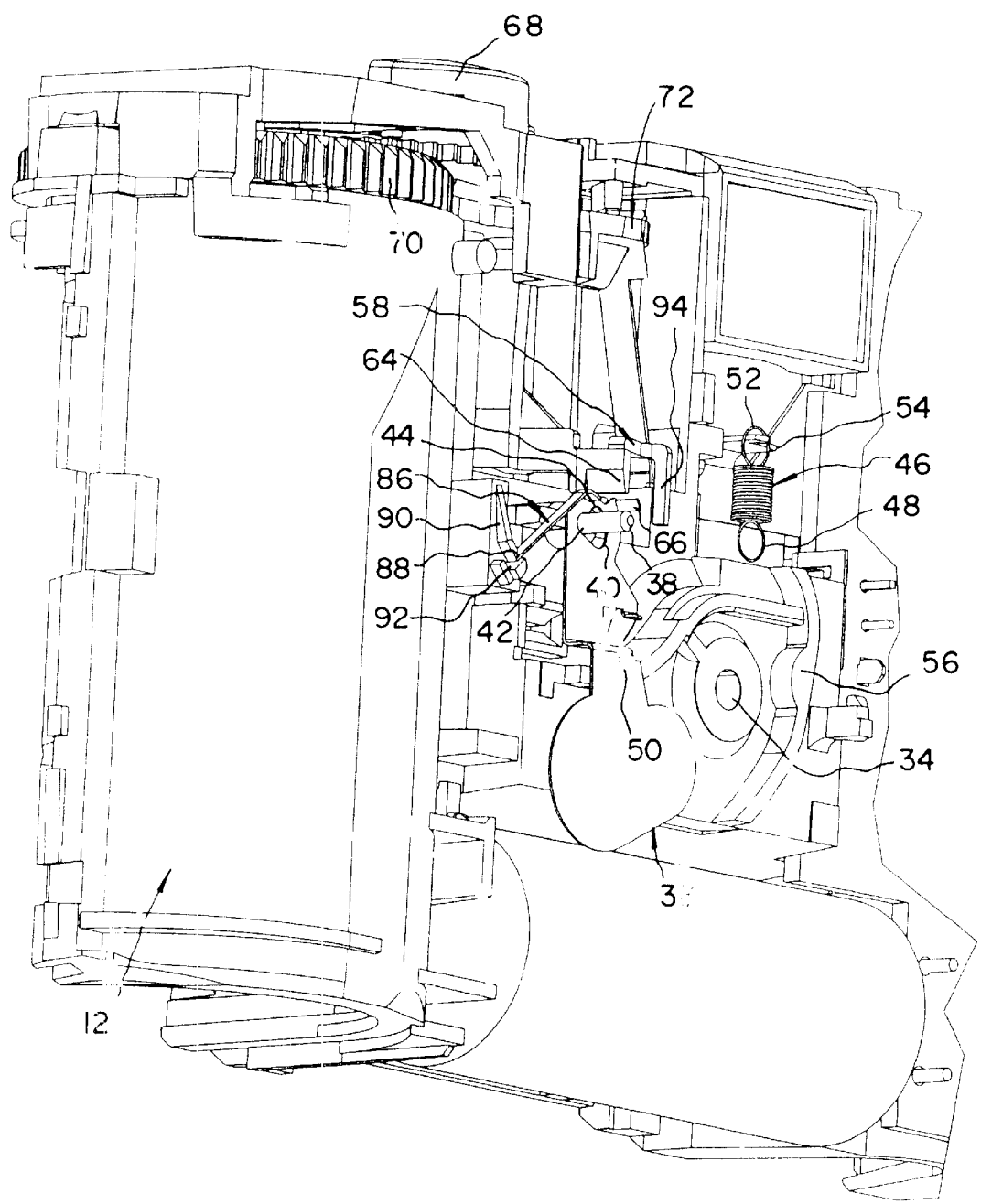
Figure 15:
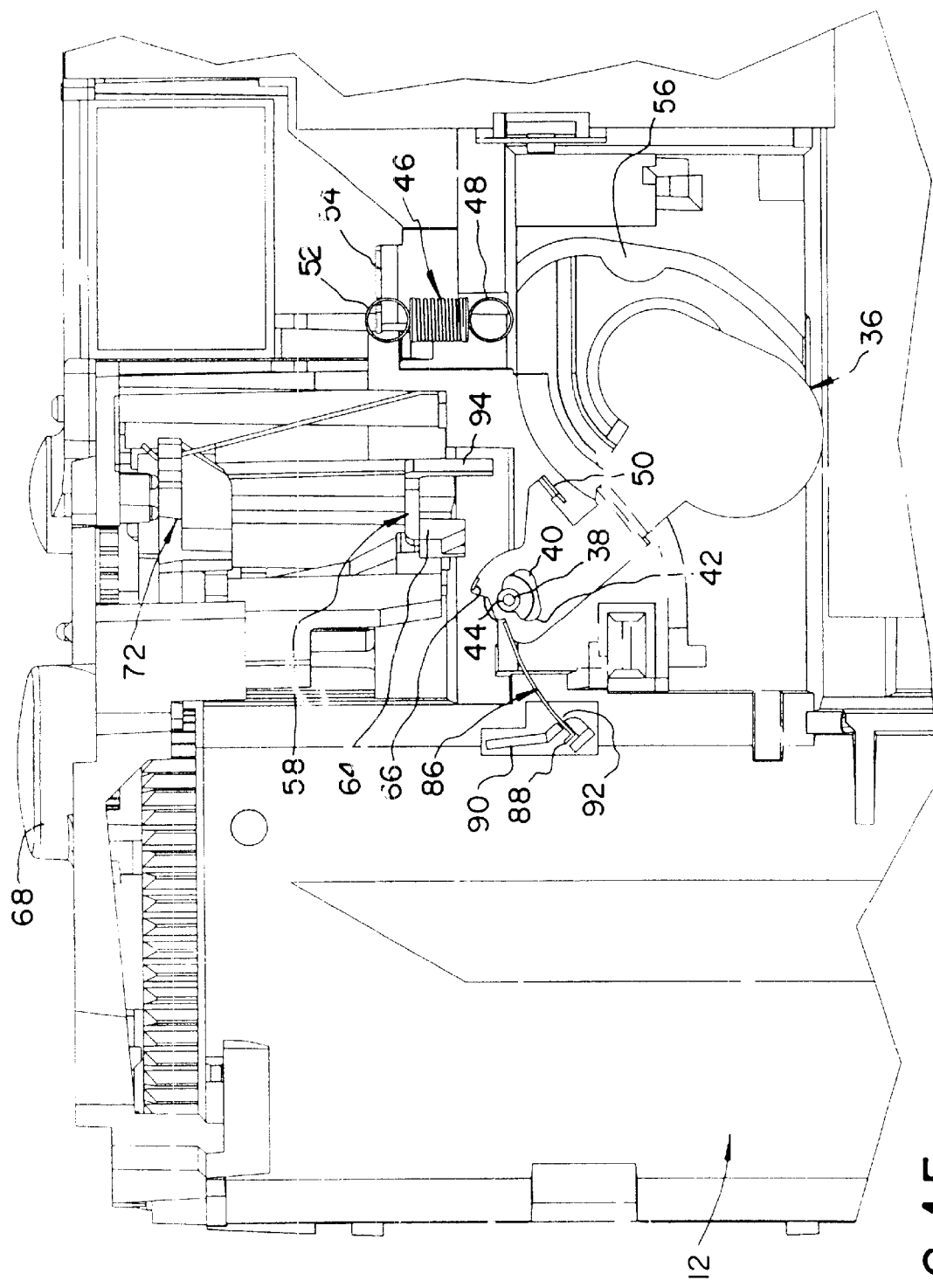
Figure 16:
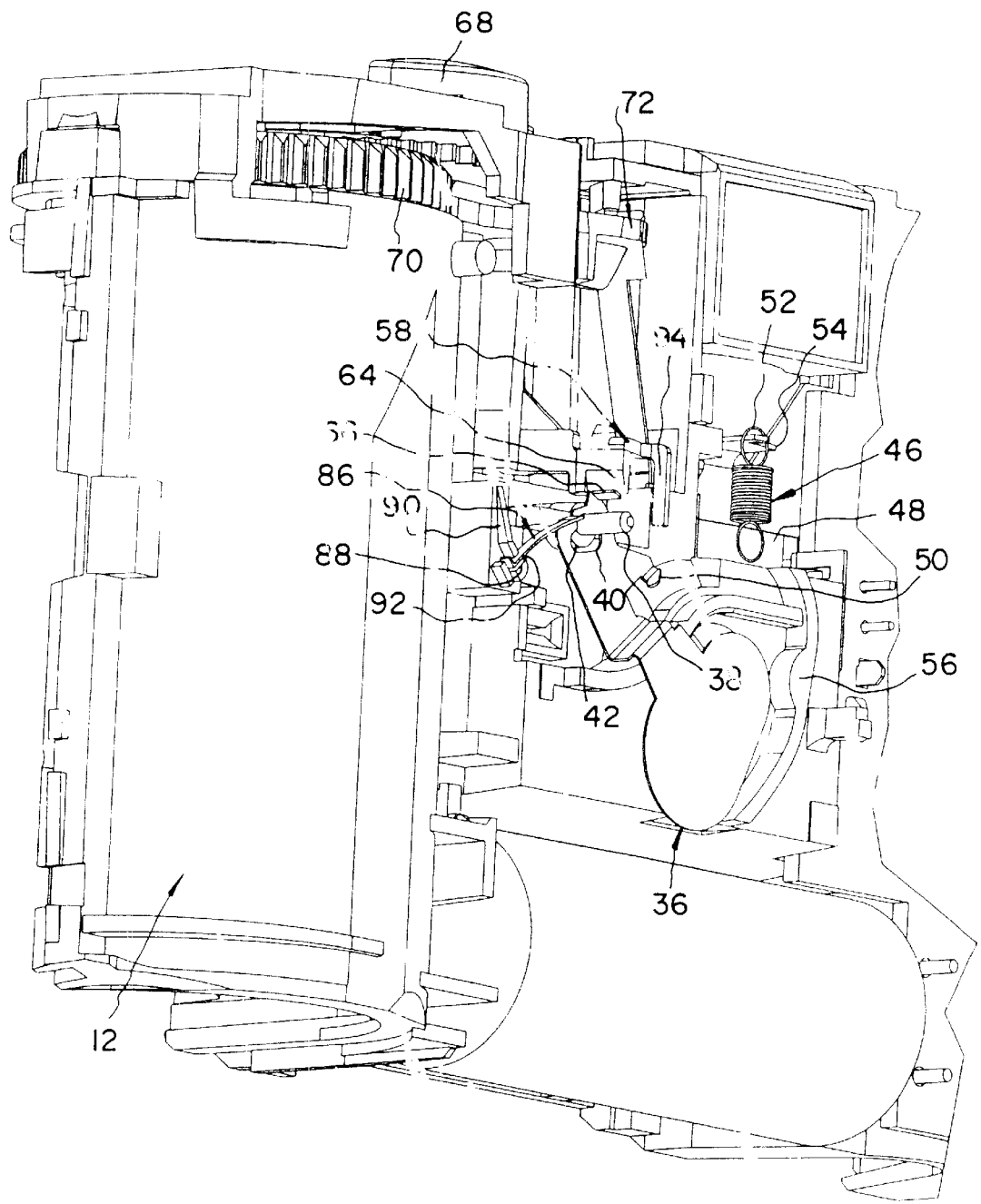
Figure 17:
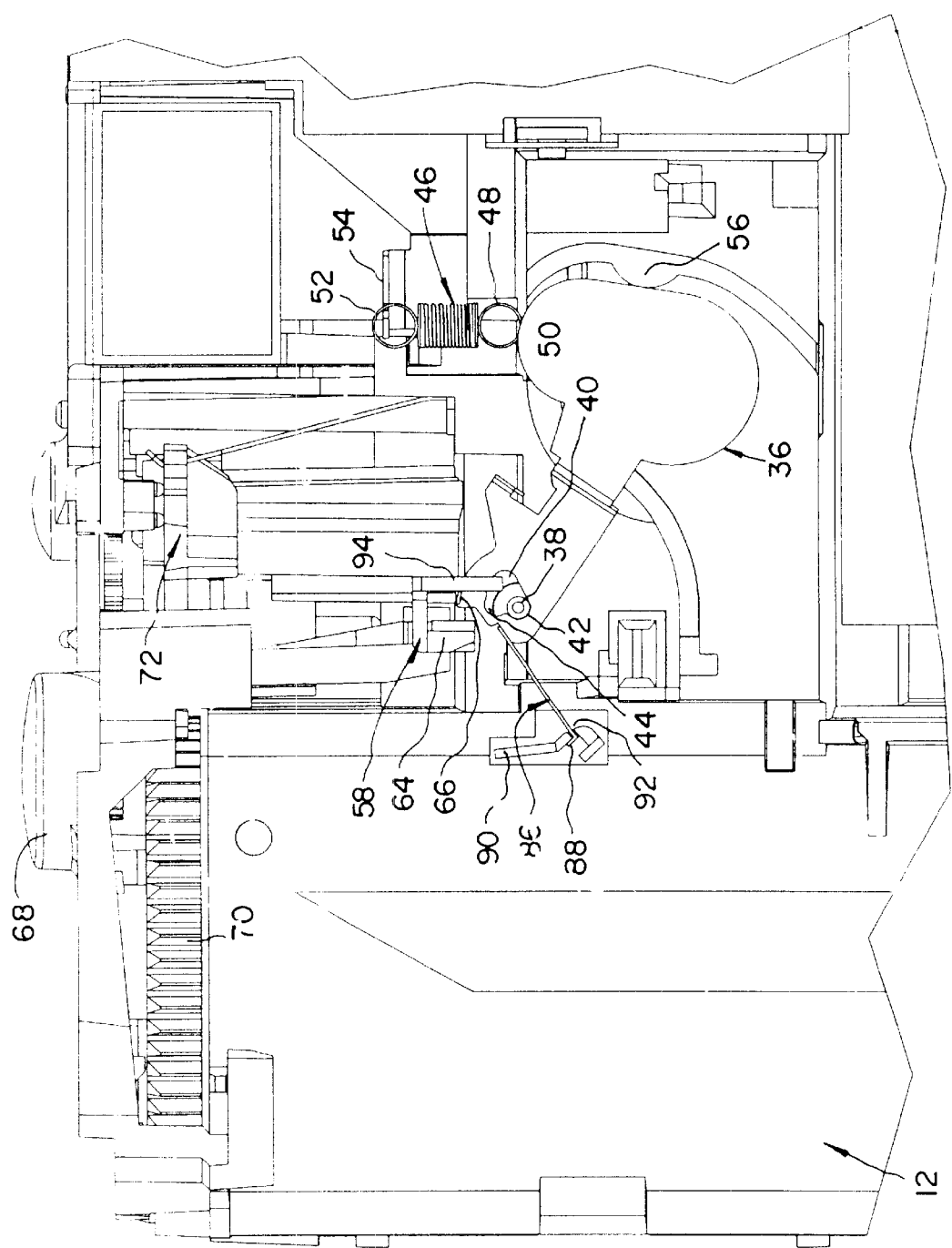
Figure 18:
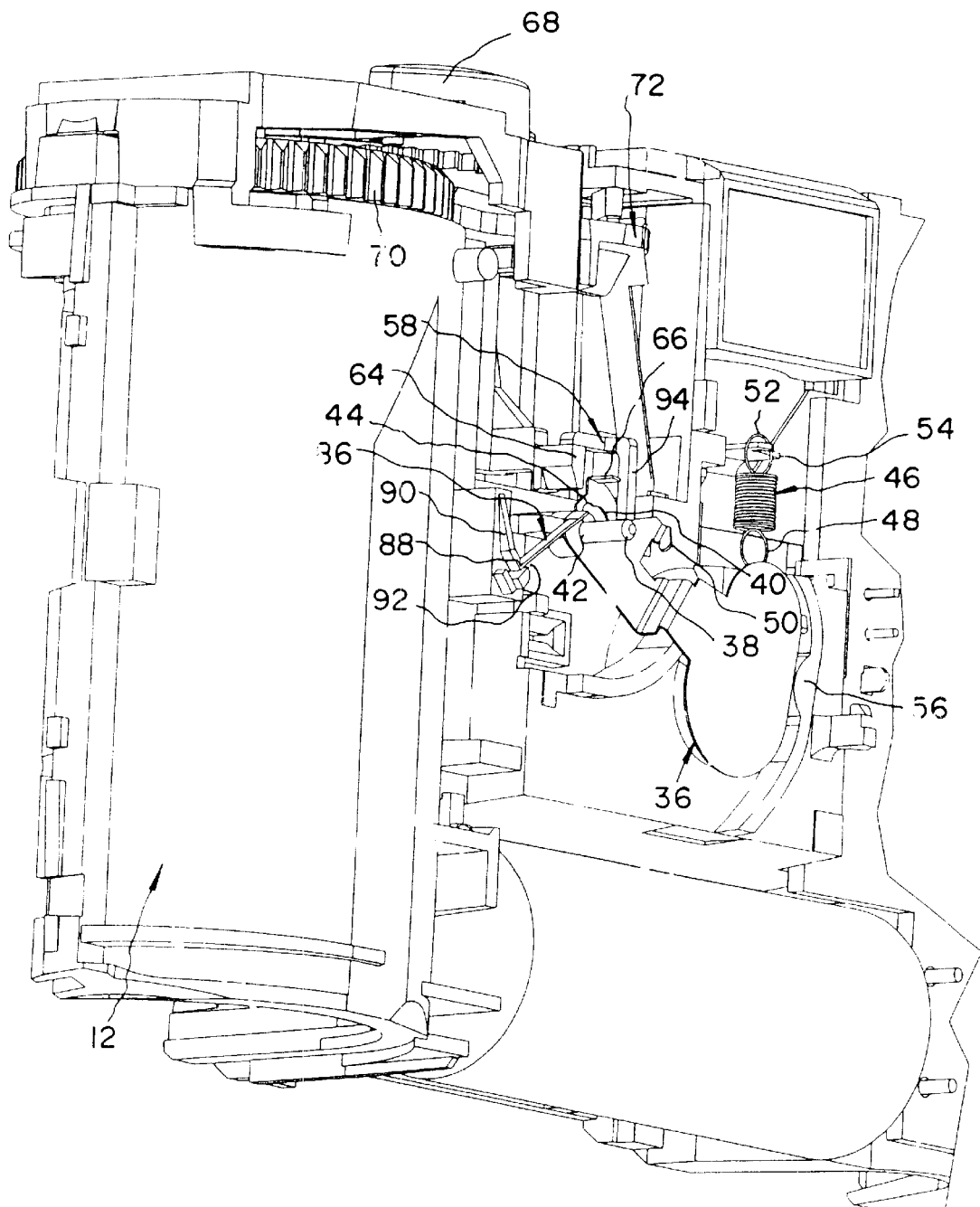

FIGS. 13–18 show a picture-taking sequence when the substitute return spring 86 is used functionally in place of the primary return spring 46. In FIGS. 13 and 14, the high-energy lever 58 is pivoted counter-clockwise about the post 60 to swing the striker 64 of the high-energy lever against the tang 66 of the shutter blade 36, to pivot the shutter blade (with the post 38 in the first fulcum-recess 42) open to uncover the exposure aperture. In FIGS. 15 and 16, the substitute return spring 86 pivots the shutter blade 36 to re-cover the exposure aperture 34 and to shift the shutter blade 36 to remove the first fulcrum recess 42 from the post 38 and move the second fulcrum-recess 44 to the post. In FIGS. 17 and 18, the high-energy lever 58 is pivoted clockwise to be re-cocked or re-set and its return finger 94 pushes against the tang 66 to pivot the shutter blade 36 against the abutment stop 36 and to shift the shutter blade to remove the second fulcrum recess 44 from the post 38 and return the first fulcrum-recess 42 to the post.

The invention has been described in detail with particular reference to certain preferred embodiments thereof, but it will be understood that variations and modifications can be effected within the spirit and scope of the invention. For example, instead of the primary return spring 46 and the substitute return spring 86, there could included primary and substitute actuators such as primary and substitute solenoids.

PARTS LIST 10. one-time-use camera
12. main body part
14. front cover part
16. rear cover part
18. cartridge receiving chamber
20. film cartridge
22. film supply chamber
24. unexposed film roll
26. film supply spool
28. unexposed filmstrip
30. film winding spool
32. taking lens
34. exposure aperture
36. shutter blade
38. post
40. blade opening
42. first fulcrum-recess
44. second fulcrum-recess
46. primary return spring
48. spring end
50. hook
52. spring end
54. hook
56. abutment stop
58. high-energy lever
60. post
62. lever hole
64. striker
66. tang
68. shutter release button
70. thumbwheel
72. metering lever
74. post
76. lever hole
77. tooth
78. film perforations
80. exposure counter wheel
82. cam
84. curved edge
86. substitute or back-up return spring
88. free end
90. ramp
92. trap
94. return finger

What is claimed is:

1. A single camera for taking only one picture at a time, comprising:
a single operation-performing device movable to perform a camera operation;
a primary actuator moving said singe operation-performing device to perform the camera operation, but susceptible of mechanically failing so as to be unable to move said singe operation-performing device to perform the camera operation; and
a substitute actuator operable to move said single operation-performing device to perform the camera operation only when said primary actuator is mechanically fails.

2. A single camera for taking only one picture at a time, comprising:
a single operation-performing device movable to perform a camera operation;
a primary actuator connected to said single operation-performing device to move said single operation-performing device to perform the camera operation, but susceptible of becoming disconnected from said singe operation-performing device so as to be unable to move said single operation-performing device to perform the camera operation; and
a substitute actuator connected to said single operation-performing device, but operable to move said single operation-performing device in place of said primary actuator to perform the camera operation only when said primary actuator is disconnected from said single operation-performing device.

3. A camera mechanism comprising:
an operation-performing device movable to perform a camera operation;
a primary spring normally urging said operation-performing device to perform the camera operation, but susceptible of failing to move said operation-performing device; and
a substitute spring alternatively urging said operation-performing device to perform the camera operation when said primary spring fails to move said operation-performing device.

4. A camera mechanism as recited in claim 3, Wherein said operation-performing device is a shutter blade movable to cover and uncover an exposure aperture.

5. A camera mechanism as recited in claim 4, wherein said primary spring normally urges said shutter blade for movement to cover said exposure aperture, and said substitute spring alternatively urges said shutter blade for movement to cover said exposure aperture when said primary spring fails to move said shutter blade.

6. A camera mechanism as recited in claim 4, wherein a primary spring is connected to said shutter blade to move said shutter blade to cover said exposure aperture and may become disconnected from said shutter blade, and said substitute spring is connected to said shutter blade to move said shutter blade to cover said exposure aperture when said primary spring becomes disconnected from said shutter blade.

7. A camera mechanism as recited in claim 6, wherein said shutter blade has an opening with a pair of alternative fulcrum recesses, a post resides in a first one of said fulcrum-recesses when said shutter blade moves to uncover said exposure aperture, said substitute spring shifts said shutter blade to remove said first one of the fulcrum-recesses from said post and move a second one of said fulcrum-recesses to said post when said substitute spring moves said shutter blade to cover said exposure aperture, and a high-energy lever for moving said shutter blade to uncover said exposure aperture is reversible to shift said shutter blade to remove said second one of the fulcrum-recesses from said post and return said first one of the fulcrum-recesses to said post.

8. A camera mechanism as recited in claim 7, wherein said high-energy lever has a striker for striking a tang of said shutter blade to move said shutter blade to uncover said exposure aperture and has a return finger pushing said tang to shift said shutter blade to remove said second one of the fulcrum-recesses from said post and return said first one of the fulcrum-recesses to said post.

9. A single camera for taking only one picture at a time, comprising:

a single operation-performing device movable to perform a camera operation;

primary means for moving said single operation-performing device to perform the camera operation, but susceptible of mechanically failing so as to be unable to move said singe operation-performing device to perform the camera operation; and substitute means operable to move said single operation-performing device to perform the camera operation only when said primary means mechanically fails.

10. A method of operating a camera mechanism, comprising:

a primary spring connected to an operation-performing device moving the operation-performing device to perform a camera operation; and a substitute spring connected to the operation-performing device moving the operation-performing device to perform the camera operation only when the primary spring becomes disconnected from the operation-performing device.

11. A method of operating a camera mechanism, comprising:

a primary spring, connected to a shutter blade, moving the shutter blade to cover an exposure aperture; and a substitute spring, connected to the shutter blade, moving the shutter blade to cover the exposure aperture only when the primary spring becomes disconnected from the shutter blade.

* * * * *